(12) United States Patent
 Lewis (10) Patent No.: US 8,683,767 B2
(45) Date of Patent: Apr. 1, 2014

(54) ENERGY BARRIER, A RAIL FOR A BUILDING FRAME CAVITY INSULATION SYSTEM AND A METHOD OF ASSEMBLING STACKED LAYERS OF REFLECTIVE DEAD AIR SPACES

(76) Inventor: David L. Lewis, Bethlehem, CT (US)

( * ) Notice: Subject to any disclaimer, the term of this patent is extended or adjusted under 35 U.S.C. 154(b) by 77 days.

(21) Appl. No.: 13/101,302

(22) Filed: May 5, 2011

(65) Prior Publication Data
US 2011/0271609 A1 Nov. 10, 2011

Related U.S. Application Data

(60) Provisional application No. 61/395,147, filed on May 7, 2010.

(51) Int. Cl.
*E04B 1/74* (2006.01)
(52) U.S. Cl.
USPC .......................................... 52/407.3; 52/408
(58) Field of Classification Search
USPC ............... 52/407.3, 407.2, 407.5, 408, 405.4, 52/745.21, 480, 481.1, 317, 653.1, 655.1, 52/696
See application file for complete search history.

(56) References Cited

U.S. PATENT DOCUMENTS

| | | | | |
|---|---|---|---|---|
| 2,191,804 | A | * | 2/1940 | O'Malley ...................... 52/407.3 |
| 2,276,076 | A | * | 3/1942 | Finck ................................. 52/515 |
| 2,662,043 | A | * | 12/1953 | Clements ........................ 428/120 |
| 2,777,786 | A | * | 1/1957 | Schwartz et al. ............. 52/406.3 |
| 2,839,789 | A | * | 6/1958 | Adams ............................ 52/405.4 |
| 2,906,655 | A | * | 9/1959 | Blumenstein ................ 52/406.3 |
| 3,165,791 | A | * | 1/1965 | Valsvik ......................... 52/405.4 |
| 3,460,299 | A | * | 8/1969 | Wilson ............................ 52/144 |
| 4,107,887 | A | * | 8/1978 | Wendt ............................. 52/105 |
| 4,160,349 | A | * | 7/1979 | DeSchutter .................. 52/407.5 |
| 4,318,260 | A | * | 3/1982 | Siegel et al. ................. 52/407.4 |
| 4,486,997 | A | * | 12/1984 | Roy .............................. 52/406.3 |
| 5,918,436 | A | * | 7/1999 | Alderman ..................... 52/407.3 |
| 6,330,775 | B1 | * | 12/2001 | Hubbard ......................... 52/474 |
| 6,397,531 | B1 | * | 6/2002 | Martin ......................... 52/220.6 |
| 7,104,018 | B2 | * | 9/2006 | Romes et al. ............... 52/405.1 |
| 7,571,578 | B2 | * | 8/2009 | Moody et al. ................ 52/481.1 |
| 2004/0163345 | A1 | * | 8/2004 | Alderman ..................... 52/404.1 |
| 2006/0123723 | A1 | * | 6/2006 | Weir et al. .................... 52/302.1 |

\* cited by examiner

*Primary Examiner* — Basil Katcheves
(74) *Attorney, Agent, or Firm* — Ware, Fressola, Maquire & Barber LLP (57) ABSTRACT

An energy barrier is made of adjustable width insulating rails, reflective insulation panels and a gasketing element to create a single layer or multi-layer stack of reflective dead air spaces within cavity spaces of framing members of a building envelope where an efficient energy barrier is desired.

8 Claims, 7 Drawing Sheets

ENERGY BARRIER, A RAIL FOR A BUILDING FRAME CAVITY INSULATION SYSTEM AND A METHOD OF ASSEMBLING STACKED LAYERS OF REFLECTIVE DEAD AIR SPACES

BACKGROUND

The subject matter of the present application relates to thermal energy barriers for buildings, a rail component thereof, and a method for forming an insulating air cavity.

A typical way to try to create an insulating air cavity for instance between a pair of overhead joists is to loosely place a layer of aluminum foil on top of fiberglass and push the fiberglass with aluminum foil loosely lying on top into the joist bay but not all the way in so as to try to leave a small air space, with the aluminum foil facing the floor board so that radiant heat from the floor into the cavity reflects back off the aluminum foil toward the floor board rather than toward the basement. The fiberglass insulation resists additional heat loss through convection and conduction toward the basement.

A problem with this method of installation of a radiant reflective barrier is that it is not easy to judge the proper amount of insertion of the insulation so as to maintain the at least three-quarters to one inch of air space needed to create a proper air cavity for a dead air space between the floor and the reflective foil lying on top of the fiberglass batting below. A similar problem exists between studs in forming an air cavity in the same way for a similar purpose for a wall or ceiling or for forming a cavity between roof joists and the roof in an attic.

Another problem is that, over time, dust can settle on the top of the aluminum foil or other reflective surface on top of the fiberglass so that the reflectivity is adversely affected.

Yet another problem is that the standard distance between support members or joists is not always consistent, even within the same building. While that may be easier to deal with when using a loosely placed layer of aluminum foil on top of fiberglass pushed into the cavity, it is a more difficult problem to address when trying to standardize a pre-manufactured thermal barrier made for instance of synthetic foam such as shown in U.S. Patent Application Publication No. 2001/00229487.

SUMMARY

According to a first aspect of the present invention, an energy barrier comprises insulating rails and reflective insulation panels formed to create a single layer or multi-layer stack of reflective dead air spaces within cavity spaces of framing members of a building. The energy barrier may be inserted between two facing joists, studs or rafters so as to be pushed up against a facing surface and fastened thereto or to the joists to form an air cavity between the facing surface and the energy barrier.

According to a second aspect of the present invention, a rail for an energy barrier comprising a pair of such rails is for insertion on opposite sides of a cavity formed by joists and a floor, wall or ceiling surface, wherein the rail is for supporting a side of a reflective insulation panel installed to form the energy barrier, wherein the rail comprises a block for insertion in the cavity formed by the joists and the floor, wall or ceiling surface, the rail having a slot, groove, or other receptacle for accepting the side of the insulation panel on one side of the energy barrier so that the reflective insulation panel is supported between the joists in parallel with the floor, wall or ceiling surface to form an insulated reflective dead air space between the reflective insulation panel and the floor, wall or ceiling surface In further accord with the second aspect of the present invention, another rail is mountable onto a rail already installed within the cavity so as to support another reflective insulation panel forming another insulated reflective dead air space layered above an already installed reflective dead air space. Thus, multiple dead air space layers may be formed by stacking rails.

According to a third aspect of the present invention, a method for assembling an energy barrier in a cavity formed between support members of a building comprises placing a pair of rails on opposing sides of the cavity, and inserting a reflective insulation panel in slots, grooves or receptacles formed in said rails so that said reflective insulation panel lies in parallel to a floor, wall or ceiling surface and a reflective dead air space is formed in between the surface, the panel and the support members.

Further in accord with the third aspect of the present invention, the method further comprises placing a second pair of rails on the first pair of rails described above, also on opposing sides of the cavity, and inserting a second reflective insulation panel in slots, grooves, or other receptacles formed in the second pair of rails so that the second reflective insulation panel also lies in parallel to the floor, wall or ceiling surface and a second reflective dead air space is formed between the first reflective insulation panel described above, the second reflective insulation panel, and the support members.

The above described multi-layered method is not limited to two barriers. A third pair of rails may be placed on the second pair of rails, also on opposing sides of the cavity, and a third reflective insulation panel inserted in slots, grooves, or other receptacle formed in the third pair of rails so that the third reflective insulation panel also lies in parallel to the floor, wall or ceiling surface and a third reflective dead air space is formed between the second panel, the third panel, and the framing members.

The method may of course be extended to form further layers beyond the two or three described.

According to a fourth aspect of the present invention, a rail is provided so as to be insertable on one side of a bay opposite another rail on an opposing side of said bay, said rail and said other rail for supporting a heat barrier in between each other so as to form an air cavity between said heat barrier and an opposing building surface.

In further accord with the fourth aspect of the present invention, the rail comprises a pedestal section and a receptacle section, the receptacle section and the pedestal section together formed to support one side of the heat barrier opposite another side supported by the other rail.

In still further accord with the fourth aspect of the present invention, the rail comprises a pedestal section and an overhang section connected to the pedestal section by a connecting section, the overhang section positioned opposite the pedestal section so as to form a slot or groove between the overhang section and the pedestal section, said pedestal section formed with a cavity having a shape corresponding to a shape of the overhang section so as to be capable of mating with an overhang section of another construction rail in a stacked rail configuration. The stacked rail configuration may also be useful for compact packaging in transport of a large plurality of rails to a construction site, or for installation in a stacked configuration at the construction site, or for both.

The invention stems from the realization that reflective dead air spaces similar to those used to mitigate thermal gain or loss in Thermos® bottles can be used to create very efficient energy barriers in building structures.

A similar arrangement of reflective dead spaces can be used to create efficient energy barriers in the framing envelope of houses and buildings.

These and other objects, features and advantages of the present invention will become apparent in light of the detailed description of a best mode embodiment thereof as illustrated in the accompanying drawing.

DETAILED DESCRIPTION

Figure 1:
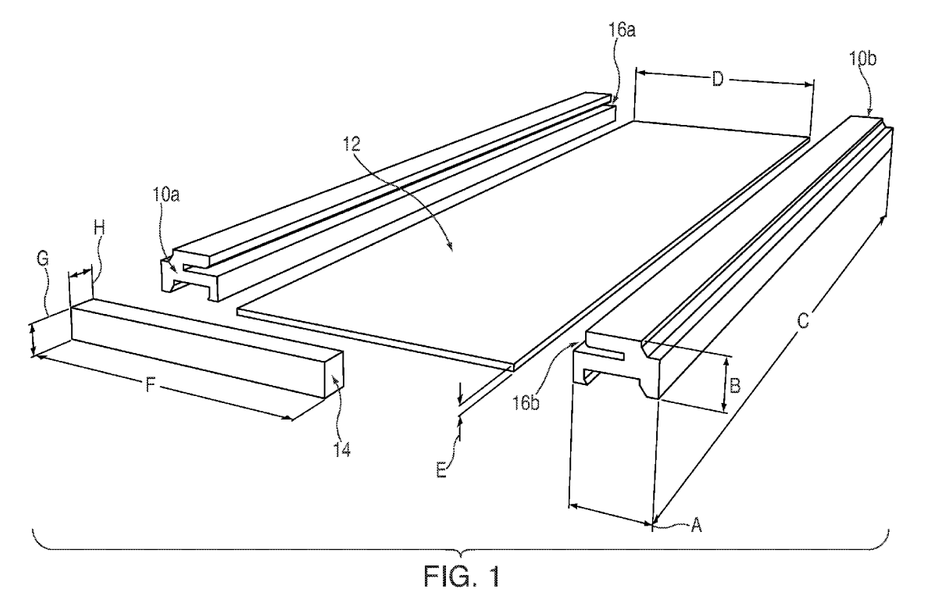
FIG. 1 shows components of an energy barrier, according to the present invention.
Figure 2:
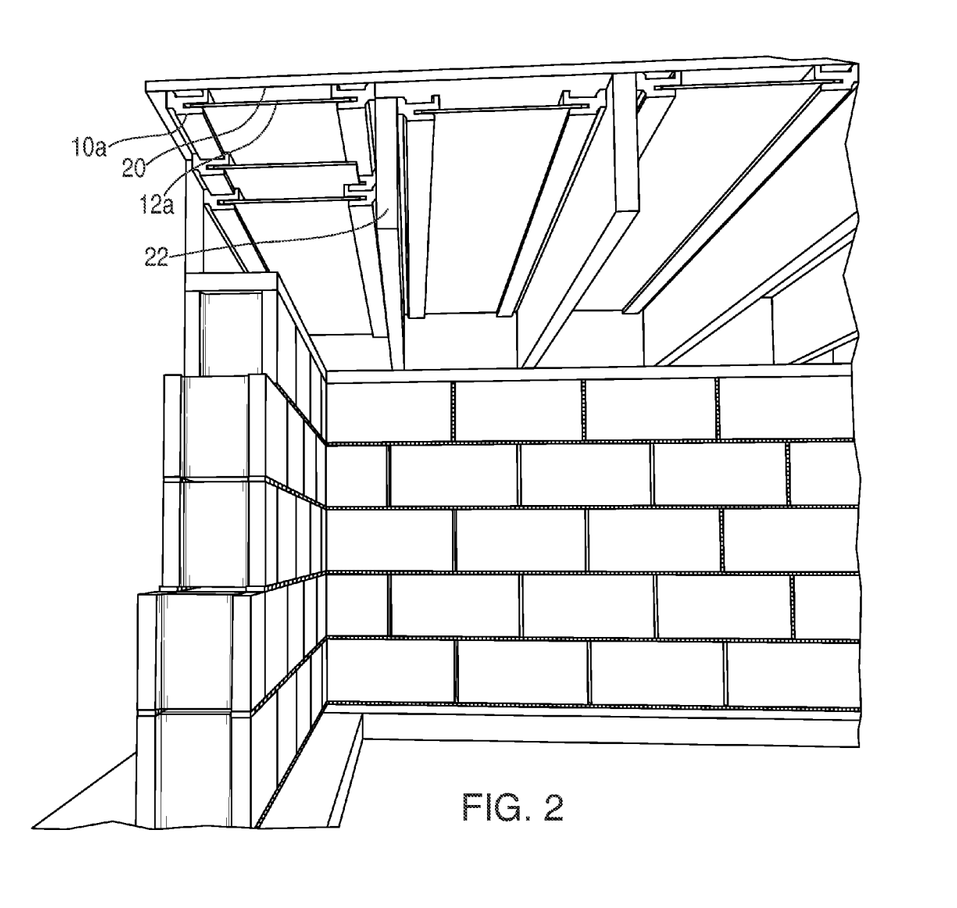
FIG. 2 shows a crawl space application in a first embodiment.

As shown in the example of FIG. 1, components of the present invention comprise insulating side rails 10a, 10b, a reflective insulation panel (RIP) 12 and a gasketing element 14. These components are assembled to create a single layer reflective dead air space within a cavity between framing or supporting members of a building envelope where an efficient energy barrier is desired or needed.

The side rails 10a, 10b of FIG. 1 are formed from an construction material such as a foamed thermoplastic, synthetic resin foam, styrofoam, expanded polystyrene, or any lightweight construction material such as cardboard and have a base width A of e.g. 2.95 inches (7.49 cm) and a height B of e.g. 1.75 inches (4.45 cm) as shown. Each rail may be cut to fit but are shown in FIG. 1 having a longitudinal (length) dimension C of e.g. 48 inches (121.92 cm). The rails each have a groove 16a, 16b, slot, or other receptacle that may for example run the length of the rail and that accepts or receives the reflective insulation panel 12 which may for instance have a width dimension D of e.g. 12 inches (30.48 cm) and may have a thickness E, e.g. of a quarter of an inch (64 mm). The illustrated slot or groove 16a, 16b in the rails is designed with sufficient depth to permit the RIP 12 to slide more or less in and out, thereby allowing for adjustment in the placement of the panel with its overall D width within the slots 16a, 16b. This width adjustment is important for accommodating for the normal variances in the standard 16 inch (40.64 cm) width found between typical building framing members (e.g. between centerlines of joists) during construction. The system is designed for the rails to be fastened to the framing members with the panel edges lying in the slots 16a, 16b of the opposing rails 10a, 10b with a reflective surface thereof facing the floor, ceiling, or wall, thus improving energy efficiency by reducing thermal transfer. Receptacles other than slots or grooves may be used such as cavities or guides for receiving tabs, pins, dowels, or the like. The gasket element 14 has a length F (e.g. 9.529 inches (24.2 cm)), a height G (e.g. 1 inch (2.54 cm)), and a width H (e.g. 1 inch (2.54 cm)). With the width A of the rails 10a, 10b being for instance approximately 3 inches and in a standard 16 inch wide bay between joists (between centerlines), each of the opposing rails attached to their respective joists will extend horizontally into the bay approximately 3 inches. If the manufactured panel width D is 12 inches, and if the slots 16a, 16b extend approximately 2 inches into each rail as shown, the panel 12 will extend into each slot 16a, 16b about 1 inch, i.e., halfway. This leaves one extra inch of play on each side so that the variation in the width of the bay that can be tolerated would be 16 inches plus or minus 2 inches (approximately). The slots in the rails of the energy barrier thus impart the adjustable width. This adjustable width insulating rail solution overcomes a problem that exists in a solution that relies on prefabricated fold-lines such as shown in FIG. 1 of co-pending application Ser. No. 12/404,542 that relies on a fairly consistent standardized separation between supporting members such as joists being separated by 16 inches on center.

Figure 6:
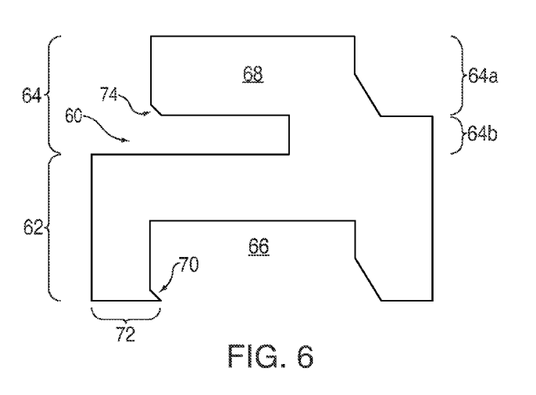
FIG. 6 shows a section of an embodiment of a rail, according to the present invention.
Figure 7:
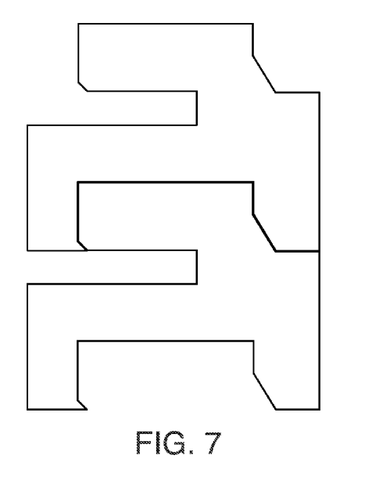
FIG. 7 shows two rails of FIG. 6 in a stacked configuration.
Figure 8:
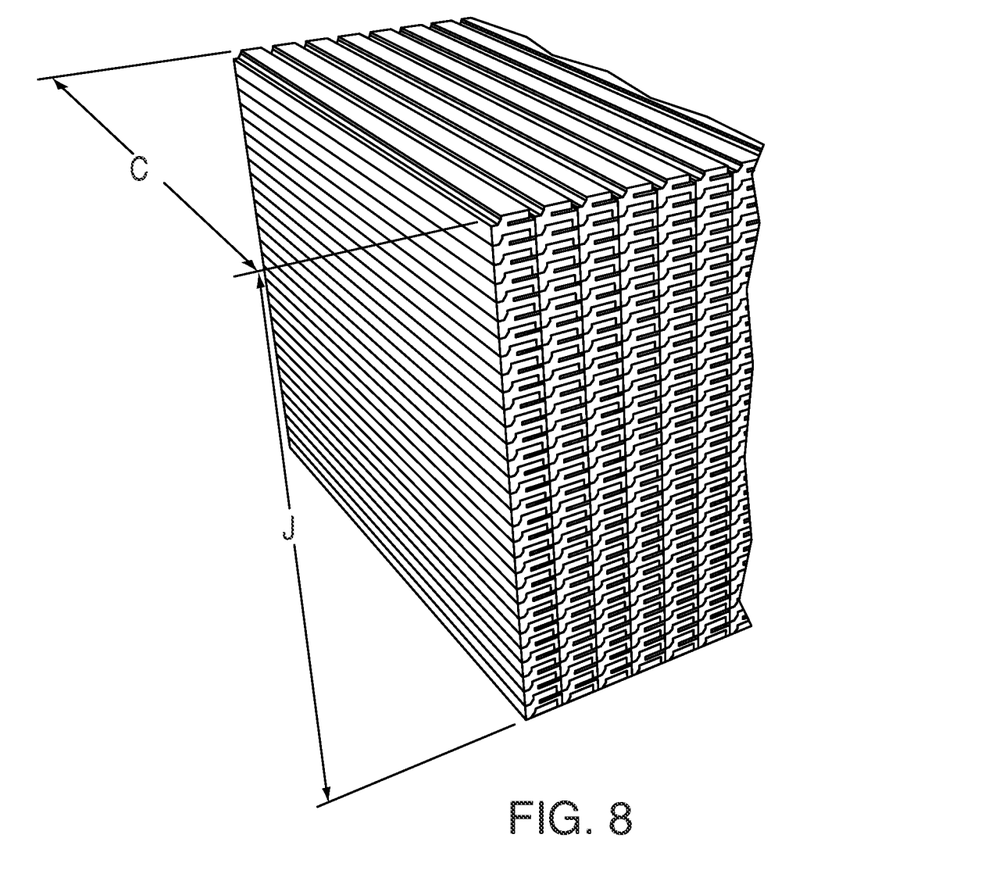
FIG. 8 shows a block of rails arranged for transport to a construction site.

FIGS. 2-5 show some example embodiments of side rails installed between supporting members with reflective insulating panels (such as the panel 12 of FIG. 1) inserted in the slots or grooves thereof with the stacked rail configuration illustrated in all four embodiments. A section view of an embodiment of a rail according to the present invention is shown in FIG. 6 and a stacked configuration of two rails is shown in FIG. 7. FIG. 8 shows one way in which the rails can be formed in the factory so that they are formed in a mated or stacked together fashion and are in this way made suitable for easy and ready-made transport in a single block of e.g. foam material. In the various embodiments of FIGS. 2-5, the side rails are inserted between the supporting members such as the floor joists 22 of FIG. 2, the ceiling joists 78a, 78b of FIG. 3, the roof rafters 40a, 40b of FIG. 4 and the wall studs 50, 54 of FIG. 5 up against a building surface such as the flooring 20 of FIG. 2, the ceiling 32 of FIG. 3, the roof 40 of FIG. 4 and the side wall 52 of FIG. 5. The side rails may be fastened to a building surface such as e.g. to the support members 22, 78a, 78b, 40a, 40b, 50, 54 in any desired fashion or may be pressed up against the support members by virtue of either a tight fit of the reflective insulating panel within the grooves or by fastening the rails in place. All of the embodiments of FIGS. 2-5 show the advantageous creation of multiple dead space layers created by stacked configurations of rails and reflective insulating panels.

In order to create the dead air pockets within any of the embodiments of FIGS. 2-5, the gasketing element 14 may be used as an end-cap and applied to the ends of each pair of rails and RIP assembly. It may take the form of a rod having a square section shown in the Figures and may be made of the same material as the rails. It may installed in such a way that it creates a half-lap seal with RIPs that are adjacent to each side of it or may be installed as an end cap. The gasketing elements 14 at both ends of an exemplary four foot long assembly seals off the cavity and helps protect the reflective insulation panel 12 surfaces from dust and dirt contamination thereby protecting the emissivity qualities of the reflective surface for each layer that is installed or added.

The rails are designed in such a way that multiple layers of insulating reflective dead air spaces can be created by snapping in more layers of rails and RIP, as shown in the embodiments of FIGS. 2-5. As shown in each of these Figures, the RIPs at the various layers can be made to have different widths, lengths and thicknesses depending on the nature of the framing cavity to be insulated and the level of energy efficiency desired. The rails are made so as to be stackable with a mating snap-together feature formed in the top and bottom of each rail. This feature can take many different forms with one such embodiment shown in FIGS. 6-7. As shown in each of the embodiments of FIGS. 2-5, a pair of rails are inserted on opposite sides of a cavity formed by supporting member joists, studs or rafters and a floor, wall, ceiling or roofing surface. Each rail supports a side of a reflective insulation panel installed to form the thermal energy barrier. Each rail comprises a block for insertion in the cavity formed by the joists and the floor, wall, roof, or ceiling surface. Each rail has a slot, groove, or other receptacle for accepting a side of the insulation panel on one side of the energy barrier so that the reflective insulation panel is supported between the joists, studs, or rafters in parallel with the floor, wall, roof, or ceiling surface to form an insulated reflective dead air space between the reflective insulation panel and the floor, wall, roof, or ceiling surface. Each block may be formed so as to be usable with another rail mounted thereon within the cavity so as to support another reflective insulation panel forming another insulated reflective dead air space layered adjacent (above or below or alongside depending on the perspective) the insulated reflective dead air space. The depth of the air spaces between the reflective panels surfaces is controlled by the design of the insulating side rails. A preferred depth between reflective surfaces for overall efficiency tends to be approximately 1 inch (2.54 cm).

In order to minimize thermal gaps in a given embodiment, the rails of the subsequent layers can be offset slightly to cover the seams of the butting rails below.

The RIPs can be made from any number of insulating materials in thicknesses from 1/8" (32 mm) to 1" (2.54 cm) or more. The preferred thickness for many applications would be 1/4" (64 mm) thick RIPs.

This system is applicable for any building framing cavity where an efficient energy barrier is desired such as floors, ceiling, side walls, crawl spaces and roof rafters.

Figure 3:
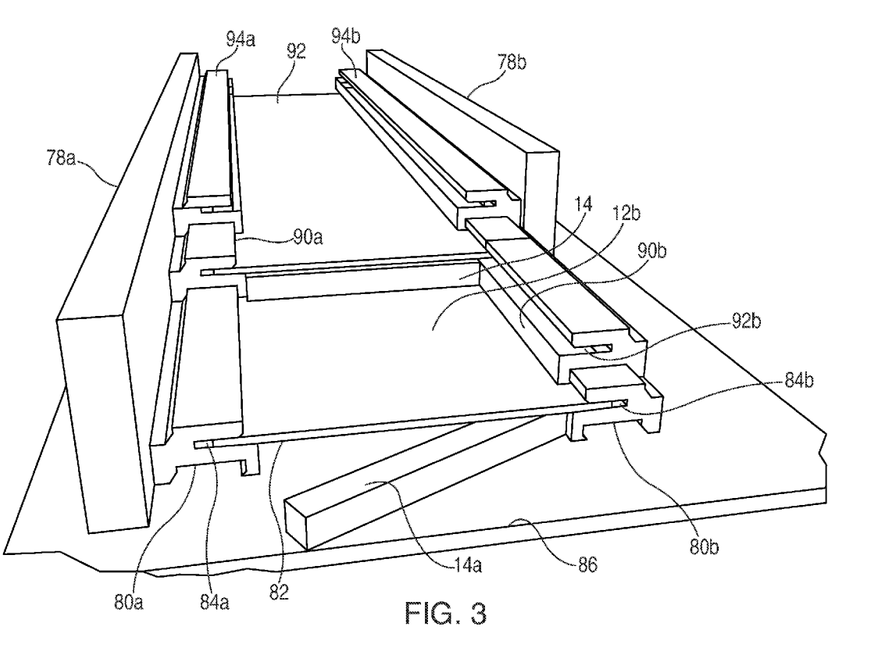
FIG. 3 shows a ceiling joist application in a second embodiment.

As shown for example in FIG. 3, a method for assembling an energy barrier in a cavity of the type shown in the various embodiments hereof so as to be formed between framing members 78a, 78b of a building, comprises placing a pair of rails 80a, 80b on opposing sides of the cavity and inserting a reflective insulation panel 82 in slots 84a, 84b formed in the rails 80a, 80b so that the reflective insulation panel 82 lies in parallel to a floor, wall or ceiling surface 86 (with a reflective surface of panel 82 facing surface 86) and a reflective dead air space is formed between the surface 86, the panel 82 and the framing members 78a, 78b with an end piece or gasket material 14 inserted at the end to seal off the dead air space. A pressure sensitive adhesive 14a may be pre-applied on the gasket material to aid in securing the gasket material to form a proper seal.

Such a method may further comprise placing a second layer of abutting rail pairs in the bay (only two rails 90a, 90b are shown) onto the first pair of rails 80a, 80b described in the preceding paragraph, also on opposing sides of the same cavity, and inserting a second layer of abutting reflective insulation panels such as a panel 92 in opposing slots formed in the second pair of rails e.g. slot 92b so that the second layer of panels, such as the reflective insulation panel 92, also lie in parallel to the floor, wall or ceiling surface. For each four foot section, a second reflective dead air space is formed between the first reflective insulation panel described in the preceding paragraph, the second reflective insulation panel, and the framing members. Since the panels in the illustrated embodiments are 48 inches (121.92 cm) long, the figures suggest a series of thermal energy barriers assembled in four foot abutting sections and then layered so as to form a stack of dead air cavities in a given bay.

Thus, as shown in FIG. 3, the above described method is not limited to two barriers. A third thermal layer comprising a not shown panel placed between a third pair of rails 94a, 94b may be placed on top of the second pair of rails, also on opposing sides of the cavity. The third reflective insulation panel is inserted in slots formed in the third pair of rails so that the third reflective insulation panel also lies in parallel to the floor, wall or ceiling surface and a third reflective dead air space layer is formed between the second panel, the third panel, and the framing members.

The method may of course be extended to form further layers beyond the two or three layers described.

Figure 4:
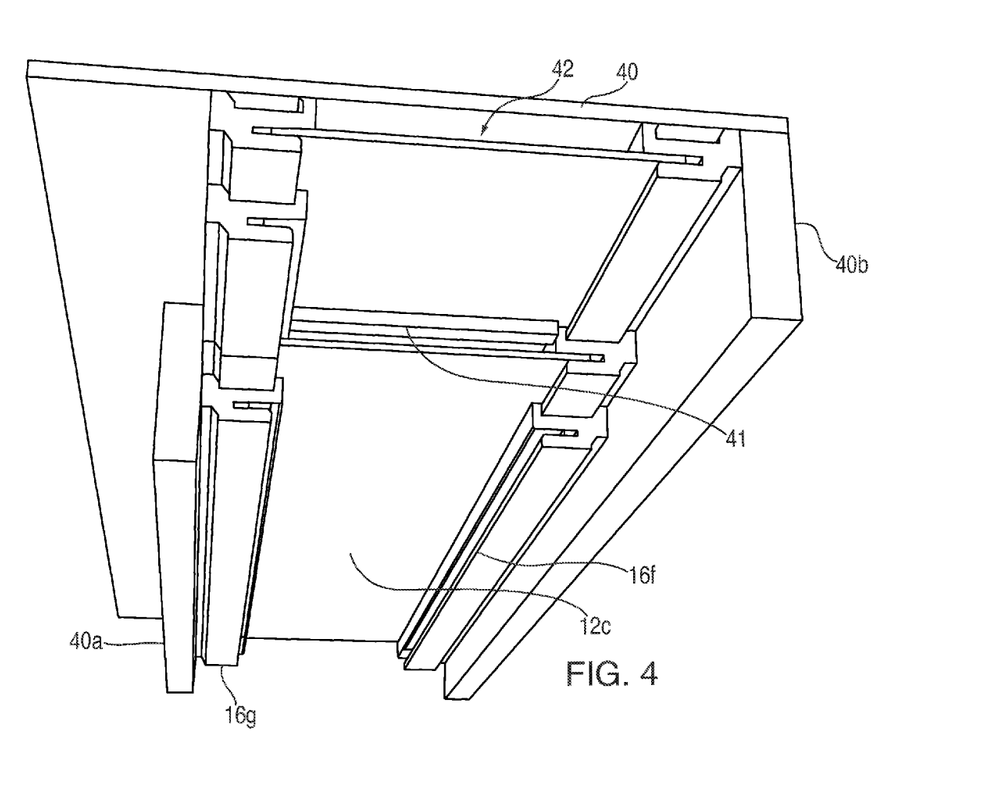
FIG. 4 shows a roof application in a third embodiment.

FIG. 4 shows a roof application of the invention for providing insulation between rafters 40a, 40b. A reflective insulating panel 12c with the shiny side up in the figure is supported by a pair of side rails 16d, 16e to form a second dead air space sealed by a gasket 41 over a first dead air space 42. A third set of side rails 16f, 16g are shown positioned on top of the second set of rails 16d, 16e ready-to-accept another reflective insulating panel (not shown) so as to create a third dead air space below the second dead air space.

Figure 5:
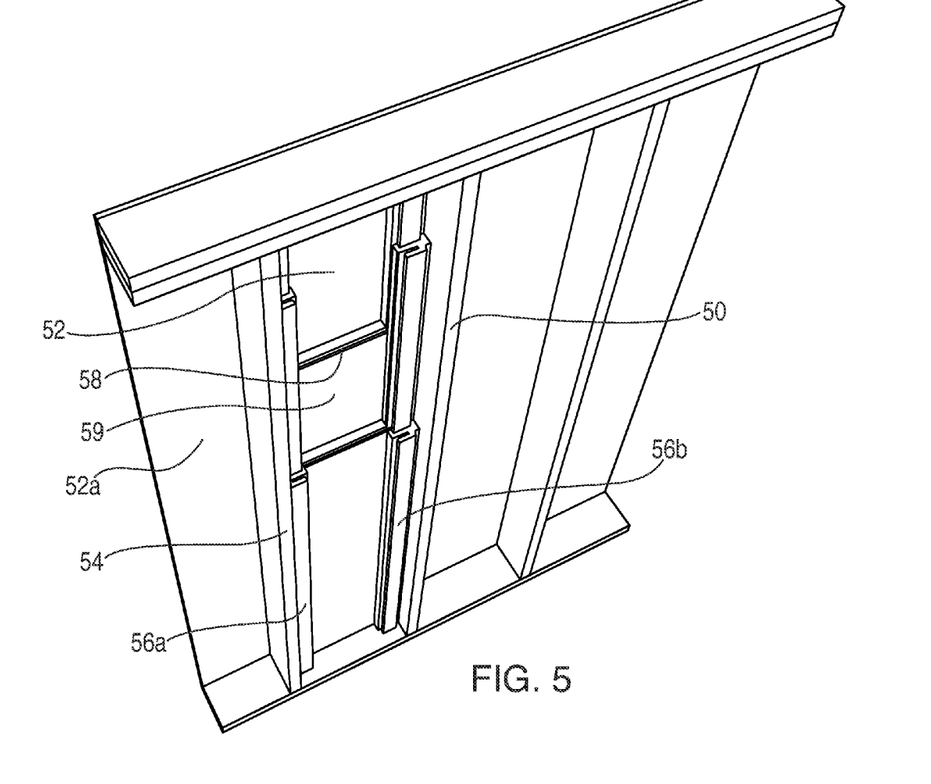
FIG. 5 shows a side wall application in a fourth embodiment

FIG. 5 shows a side wall application providing dead air insulating spaces between wall studs. In this particular embodiment a wall stud cavity 52 is formed between a wall stud 50 and another facing wall stud 54. A third layer of side rails 56a, 56b is also shown in FIG. 5, similar to FIG. 4. A typical gasket 58 is shown sealing off a dead air space between a reflective insulating panel 59 and the wall 52a.

The embodiment of a rail according to the present invention shown in FIG. 6 (not to scale) is shown having a groove or slot 60 for supporting a reflective insulation panel such as the panel 12 of FIG. 1 on one side of a building bay opposite another rail on an opposing side of the bay such as shown in any of the FIGS. 2-5. The supported reflective insulation panel has its reflective surface pointing towards the floor of FIG. 2, the ceiling of FIG. 3, the roof of FIG. 4 or the side wall of FIG. 5. The rail of FIG. 6 has a pedestal section 62 and a receptacle section 64. The receptacle section 64 is formed to support one side of the reflective insulation panel 12 opposite another side supported by an opposing rail. The slots of the opposing rails are placed in the bay so as to face each other. In other words, the orientation shown in FIG. 6 for one side of a bay is flipped 180° horizontally on the other side of the bay. The receptacle section 64 of the embodiment of FIG. 6 includes an overhang section 64a and a connecting section 64b that connects the overhang section to the pedestal section 62. The overhang section is positioned opposite a flat shelf surface of the pedestal section so as to form the slot or groove 60 between the overhang section and the shelf of the pedestal section. The depicted depth of the slot could be the above mentioned 2 inches more or less (e.g. 1.75 inches) as measured from the left vertical edge of the pedestal section 62 all the way into the slot until the end of the slot. The pedestal section 62 is formed with a cavity having a shape 66 in the side view of FIG. 6 corresponding to a cross-sectional shape 68 of the overhang section 64a so as to be capable of mating with an overhang section of another construction rail in a stacked rail configuration as shown in FIG. 7. In the particular embodiment of FIGS. 6 and 7, the shape 66 of the cavity in the pedestal is such that it includes a protruding section 70 in a footing 72 of the pedestal section 62. This protruding section can be pushed down on top of the mating overhang section of the rail to which it is being stacked on top of so that it snaps into place on a sloping chamfered edge 74 of the overhang section 64a of the other rail. The overhang section is thus shaped to mate with the cavity in the pedestal section. This helps the rail so as to be properly positioned easily in the stack configuration and may even obviate the need for a fastener, although such is not excluded in cases in which it is desired to positively fasten a stacked configuration together. Fasteners may also for instance be inserted in the top surfaces of the footings on either side of the pedestal through to another rail or through a side of a footing of the pedestal to the construction surface to which the rail is abutting so as to fasten the rail to the construction surface such as the face of a joist.

Referring to FIG. 8, there are a number of ways that the rails could be formed in the factory so that they mate or stack together for transport. They could be extruded from a foam material as shown in FIG. 8 through a die that has the desired profile. In the case illustrated in FIG. 8, the rails are cut concurrently from a block of foam material so that after each cut cycle there is a stack of rails that are nested together.

For example, to create a batch of nested rails that will provide a one inch reflective air space between the reflective panel layers from a block of expandable polystyrene material a cutting harp may be strung with multiple cutting wires, e.g., 32 wires that are spaced a convenient distance such as one and one-quarter inch apart. The wires may be electric resistance heated and the hot wires moved through the polystyrene foam on a path to create the desired profile. A block of foam such as pictured in FIG. 8 might have a J dimension e.g. 39 inches (99.06 cm) high, a C dimension e.g. 4 feet (1.2192 m) wide, and by some convenient length (not specified in the drawing) that would yield e.g. 30 vertically stacked four-foot rails per cut cycle. Cutting harps for cutting an initial volume of foam are shown for example in U.S. Pat. Nos. 6,053,661 and 4,221,148. See FIG. 2 of U.S. Pat. No. 6,053,661 for an illustration of a plurality of heated wires arranged in parallel for cutting a volume of foam as they move in unison in a side-to-side motion with the foam being pushed or pulled through the wires in a direction to cause cuts so as to produce a block such as shown in FIG. 8 hereof suitable for packaging and compact transport to a construction site.

Although the invention has been shown and described with respect to a best embodiment thereof, it should be understood by those skilled in the art that the foregoing and various other changes, omissions and deletions in the form and detail thereof may be made therein without departing from the spirit and scope of the invention.

The invention claimed is:

1. A heat barrier comprising adjustable width insulating foam plastic rails, reflective insulation panels and gasketing elements assembled into a single layer or multi-layer stack of reflective dead air spaces within cavity spaces between wooden framing members of a building having said reflective insulation panels inserted in a slot cut along the length of each of said foam plastic rails installed within said cavity spaces between said wooden framing members on opposite sides of said cavity spaces so that said reflective insulation panels are supported in said slots between said wooden framing members in parallel with a floor, wall, or ceiling of said building with said dead air spaces ended by said gasketing elements extending between said wooden framing members at ends of said reflective insulation panels, each foam plastic rail comprising a pedestal section and a receptacle section, said receptacle section and said pedestal section together formed with said slot in between for providing said support for sides of said reflective insulation panels inserted therein.

2. A foam plastic rail for a heat energy barrier comprising a pair of foam plastic rails inserted on opposite sides of a cavity formed by wooden framing members and a floor, wall or ceiling surface, said foam plastic rail for supporting a side of a reflective insulation panel installed to form said heat energy barrier, said rail for insertion in the cavity formed by said wooden framing members and the floor, wall or ceiling surface, said foam plastic rail having a slot cut along the length of said foam plastic rail for accepting the side of the insulation panel on one side of the energy barrier so that said reflective insulation panel is supported in said slot between said wooden framing members in parallel with said floor, wall or ceiling surface to form an insulated reflective dead air space between said reflective insulation panel and said floor, wall or ceiling surface, said foam plastic rail comprising a pedestal section and a receptacle section, said receptacle section and said pedestal section together formed with said slot in between for said supporting said side of said reflective insulation panel opposite another side supported by said other foam plastic rail of said pair, said receptacle section comprising an overhang section connected to said pedestal section by a connecting section, said overhang section positioned opposite a flat shelf surface side of said pedestal section so as to form said slot between said overhang section and said pedestal section, said pedestal section formed with a rail cavity in a side opposite said flat shelf surface, said rail cavity having an overhang section cavity shape so as to mate with an overhang section of another foam plastic rail in a stacked rail configuration.

3. The foam plastic rail of claim 2, wherein said pedestal section formed with a rail cavity is for mating with said overhang section of said another foam plastic rail mounted thereon within the cavity so as to support another reflective insulation panel forming another insulated reflective dead air space layered above the insulated reflective dead air space.

4. A method for assembling a heat energy barrier in a cavity formed between wooden framing members of a building, comprising:
    placing a pair of foam plastic rails on opposing sides of said cavity, each foam plastic rail comprising a pedestal section and a receptacle section, said pedestal section and said receptacle section together formed with a slot cut along the length of said foam plastic rail for accepting a side of an insulation panel on one side of said heat energy barrier in said cavity,
    inserting sides of said reflective insulation panel in opposing slots formed in said foam plastic rails so that said reflective insulation panel lies in parallel to a floor, wall or ceiling surface with a reflective side facing said surface, said opposing slots providing support for said sides of said reflective insulation panel inserted therein, and
    inserting gasketing elements extending between said wooden framing members at ends of said reflective insulation panel to form an insulated reflective dead air space bounded by said surface, said wooden framing members, and said heat barrier comprising said reflective insulation panel, said foam plastic rails, and said gasketing elements assembled between said wooden framing members.

5. The method of claim 4, further comprising:
    placing a second pair of foam plastic rails on the pair of foam plastic rails of claim 4, also on opposing sides of said cavity, and
    inserting a second reflective insulation panel in opposing slots formed in said second pair of foam plastic rails so that said second reflective insulation panel also lies in parallel to the floor, wall or ceiling surface, inserting second gasketing elements extending between said wooden framing members at ends of said second reflective insulation panel to form a second reflective dead air space bounded by the reflective insulation panel of claim 4, the second reflective insulation panel, the second pair of foam plastic rails, the second gasketing elements and the wooden framing members.

6. The method of claim 5, further comprising:

placing a third pair of foam plastic rails on the second pair of foam plastic rails, also on opposing sides of said cavity, and inserting a third reflective insulation panel in opposing slots formed in said third pair of foam plastic rails so that said third reflective insulation panel also lies in parallel to the floor, wall or ceiling surface, inserting third gasketing elements extending between said wooden framing members at ends of said third reflective insulation panel to form a third reflective dead air space bounded by the second reflective insulation panel, the third reflective insulation panel, the third pair of foam plastic rails, the third gasketing elements and said wooden framing members.

7. A foam plastic rail comprising a pedestal section and a receptacle section, said foam plastic rail insertable on one side of a building bay opposite another foam plastic rail on an opposing side of said building bay, said foam plastic rail and said other foam plastic rail for supporting a heat barrier in between each other so as to form an air cavity between said heat barrier and an opposing building surface, said receptacle section and said pedestal section together formed to support one side of said heat barrier opposite another side supported by said other rail, said receptacle section comprising an overhang section connected to said pedestal section by a connecting section, said overhang section positioned opposite a flat shelf surface side of said pedestal section so as to form a slot between said overhang section and said pedestal section, said pedestal section formed with a rail cavity in a side opposite said flat shelf surface, said rail cavity having an overhang section cavity shape so as to mate with an overhang section of another rail in a stacked rail configuration.

8. The rail of claim 7, wherein said stacked rail configuration is for transport to a construction site, or for installation at the construction site, or for both.

\* \* \* \* \*